United States Patent [19]

Gibot

[11] Patent Number: 5,397,010
[45] Date of Patent: Mar. 14, 1995

[54] ISOTHERMAL CONTAINER, PARTICULARLY FOR TRANSPORTING FRESH OR FROZEN PRODUCTS

[75] Inventor: Claude Gibot, Malakoff, France

[73] Assignee: L'Air Liquide, Societe Anonyme pour l'Etude et l'Exploitation des Procedes Georges Claude, Paris, France

[21] Appl. No.: 128,209

[22] Filed: Sep. 29, 1993

[30] Foreign Application Priority Data

Sep. 29, 1992 [FR] France .................. 92 11582

[51] Int. Cl.6 .......................................... B65D 88/00
[52] U.S. Cl. ..................................... 220/1.5; 220/501; 220/505; 220/554; 312/31; 312/31.2; 312/236; 62/372; 62/407; 62/457.1
[58] Field of Search ............... 220/1.5, 412, 467, 501, 220/505, 554; 312/31, 31.01, 31.2, 31.3, 236; 62/384, 388, 385, 404, 405, 407, 371, 372, 457.9, 457.1

[56] References Cited

U.S. PATENT DOCUMENTS

| | | |
|---|---|---|
| 1,191,309 | 7/1916 | Hudson .................. 62/404 X |
| 2,143,213 | 1/1939 | Reichle .................. 62/387 |
| 2,382,859 | 8/1945 | Clerc . | 
| 2,586,893 | 2/1952 | Westling ................ 62/405 X |
| 2,632,311 | 3/1953 | Sullivan . | 
| 3,864,936 | 2/1975 | Frank et al. ............ 62/385 |
| 3,866,435 | 2/1975 | Frank et al. ........... 62/388 X |
| 3,906,744 | 9/1975 | Knapp et al. ........... 62/384 |
| 4,397,159 | 8/1983 | Dodd ..................... 62/388 X |
| 4,898,294 | 2/1990 | Jennings ................ 220/3.1 |
| 4,907,423 | 3/1990 | Hase ...................... 62/384 |

FOREIGN PATENT DOCUMENTS

| | | |
|---|---|---|
| 0066547 | 12/1982 | European Pat. Off. . |
| 0337860 | 10/1989 | European Pat. Off. . |
| 1394113 | 2/1965 | France . |
| 2178437 | 11/1973 | France . |
| 2188122 | 1/1974 | France . |
| 2416434 | 8/1978 | France . |

Primary Examiner—Allan N. Shoap
Assistant Examiner—Stephen Cronin
Attorney, Agent, or Firm—Young & Thompson

[57] ABSTRACT

The container (1) is divided interiorly into an upper chamber (3) receiving a reservoir (9) for refrigerant product, typically dry ice, and a lower chamber (4) receiving the load, by a thermal shield (6) from the edges of which extend into the lower chamber (4) a flexible baffle structure (12) guiding the circulation of cold gas between the upper chamber (3) and gas passages along the walls of the lower chamber (4) defined by vertical (10) and horizontal (11) strips. The container is especially useful for the transport of fresh or frozen products.

11 Claims, 1 Drawing Sheet

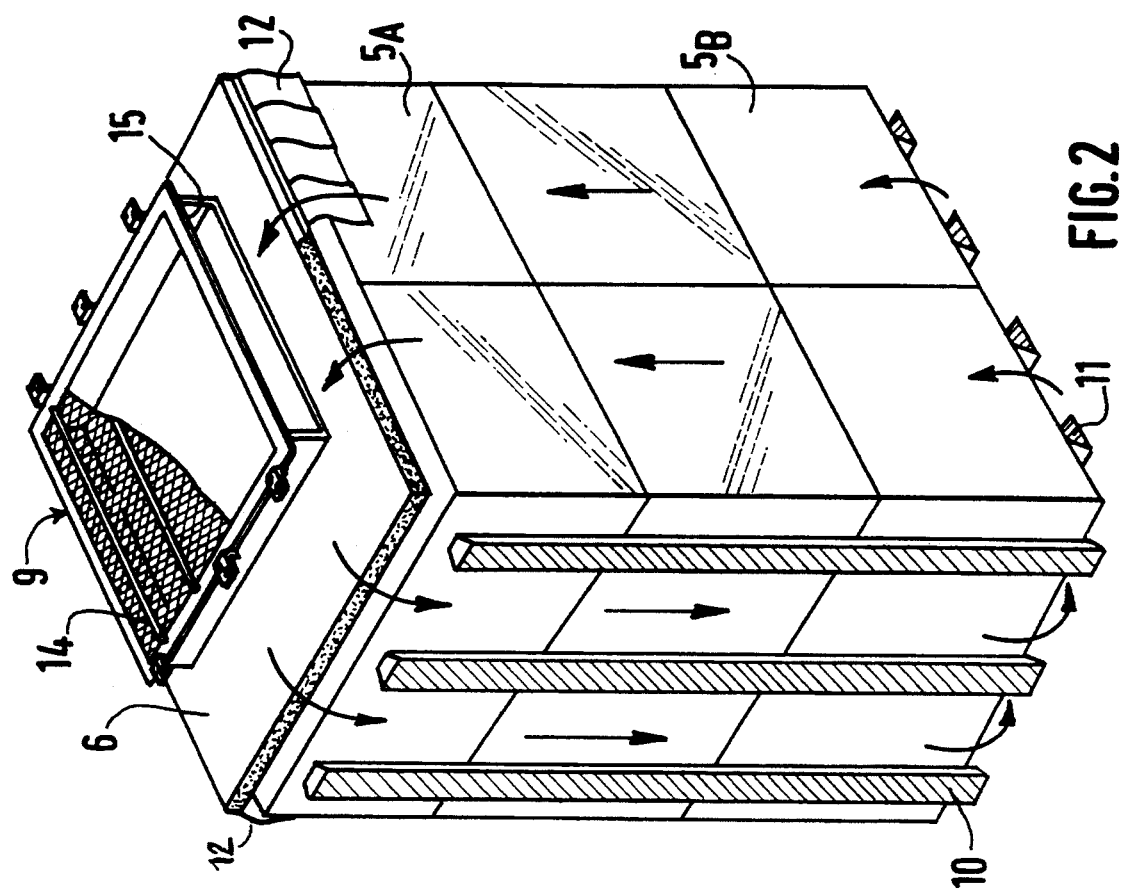
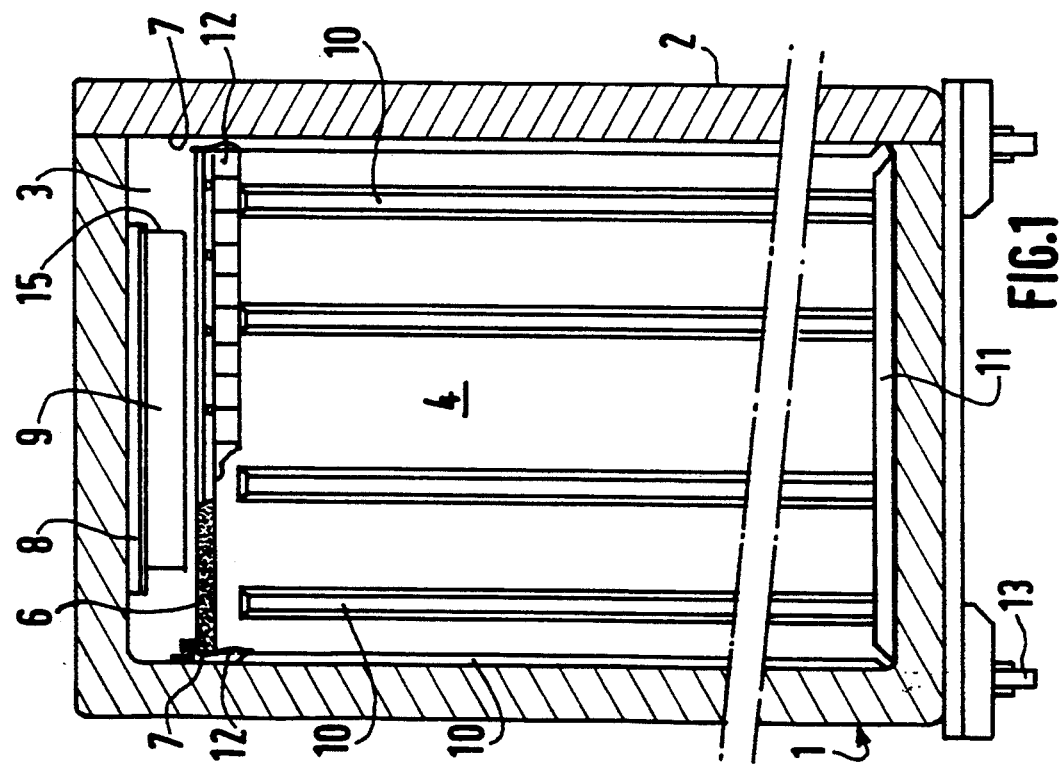

ISOTHERMAL CONTAINER, PARTICULARLY FOR TRANSPORTING FRESH OR FROZEN PRODUCTS

FIELD OF THE INVENTION

The present invention concerns an isothermal container, more particularly intended for transporting fresh or frozen products, of the type comprising a casing having isothermal walls defining an interior volume divided by a shield of thermally insulating material into an upper chamber receiving a reservoir of refrigerant product, and a lower chamber receiving a load, the upper and lower chambers communicating with one another via a passage provided all around the shield.

BACKGROUND OF THE INVENTION

A container of this type is described in European application No. 337,860, in the name of the present applicant.

With this type of container, typically using as refrigerant solid phase $CO_2$ (dry ice or carbon dioxide snow), penetration of heat across the heat insulation of the isothermal casing is compensated by sublimation of the dry ice, thereby liberating cold gas. The shield allows the upper part of the load in the lower chamber to be largely isolated from the cold source, and promotes circulation of cold gas to the periphery of at least the upper part of the lower chamber. In practice, the load must in no case be allowed to contact or become flush with the thermal shield, and it is therefore necessary to provide a clearance, typically at least 2 cm, between the shield and the upper end of the load in the lower chamber. This spacing principally promotes circulation of cold gas immediately beneath the thermal screen shield, which affects the natural convection conditions of the cold gas in the lower chamber.

SUMMARY OF THE INVENTION

The present invention has as an object to provide an improvement to the above-described container, which will ensure in a simple and reliable manner a circulation of cold gas by natural convection around and below the load disposed in the lower chamber.

To accomplish this object, according to a characteristic of the invention, the container comprises a flexible baffle structure extending downwardly into the lower chamber from the periphery of the shield.

According to more particular features of the invention:
  the shield has the structure of a plate supported in the upper chamber via its upper surface, and the baffle structure, preferably formed by a plurality of vertical bands of plastic material, is fixed at its upper portion on the edges of the plate structure;
  each internal wall of the lower chamber comprises a series of parallel strips defining therebetween passages for gas circulation, the strips being preferably formed of plastic material in a one-piece construction with the internal wall.

BRIEF DESCRIPTION OF THE DRAWINGS

Other characteristics and advantages of the present invention will appear from the following description of embodiments given by way of illustration but not to be construed as limiting, taken with reference to the accompanying drawings, in which:

FIG. 1 is a schematic view in vertical section of a container according to the invention; and FIG. 2 is a perspective view with the exterior container walls removed, showing the principal elements disposed in the upper and lower chambers of the container of FIG. 1.

DETAILED DESCRIPTION OF THE INVENTION

FIG. 1 shows an isothermal container comprising a casing structure with isothermal walls 1 that can be closed on one side by a door 2, also formed from isothermal material, and which define an interior volume divided into an upper chamber 3 of relatively smaller dimensions, intended to receive a refrigerant product, and a lower chamber 4 of relatively greater dimensions, intended to receive a load 5A, 5B (FIG. 2). The chambers 3 and 4 are separated from one another by a horizontal plate structure 6 of insulating material(s), typically expanded PVC that has been calendared and stabilized with ultraviolet radiation. For transporting frozen products, the thermal shield 6 is removably mounted and has transverse dimensions less than the corresponding transverse dimensions of the interior volume of the container 1, thereby to provide a passage 7 all around its periphery establishing free communication between the chambers 3 and 4. The plate structure 6 is supported via its upper surface, in the upper chamber such that its peripheral edges delimit the passage 7 interiorly of the container. A reservoir or tank 9 shaped like a drawer and intended to contain a refrigerant, typically a mass of dry ice, is disposed in the upper chamber 3, preferably suspended by upper slides 8 at a distance from the upper surface of the plate structure 6.

According to the invention, each vertical wall (with the possible exception of the door 2) of the lower chamber 4 is provided with a series of vertical strips 10, the base wall being similarly provided with a series of horizontal strips or ribs 11, thereby to ensure passages for circulation of gas all about, even completely about, a load 5A, 5B in the chamber 4, as shown by the arrows in FIG. 2. Moreover, all around the plate structure 6 is disposed a flexible baffle structure 12 extending downwardly into the lower chamber 4 over a distance of about 1/10th the total height of the lower chamber 4, typically on the order of 100 to 200 mm, so as to force gas circulation from and through the passages between the strips 10, 11, to pass into the peripheral passage 7, by preventing passage of gas along the lower surface of the thermal shield 6 and directly along the upper part of the load 5A.

In the embodiment shown, the baffle structure 12 is formed by a plurality of partially overlapping vertical bands secured at their upper ends to the edges of the plate structure 6. The baffle structure 12 is preferably formed from plastic material, typically flexible and transparent PVC, for food contact.

In an advantageous embodiment, the internal walls of the casing structure 1 are formed from plastic material, typically polyethylene, and the strips 10 and 11 are formed in one piece, by molding, with these internal walls. The container 1 is also advantageously provided with wheels 13 on its bottom, for permitting its displacement.

According to an aspect of the invention, as best shown in FIG. 2, the reservoir 9, typically formed of stainless steel, has the shape of a drawer with its upper open surface provided with a grill 14 allowing escape of carbon dioxide gas liberated by the dry ice, and its forward surface 15, facing the door 2, is open to allow loading, especially by injection, of carbon dioxide gas into the reservoir 9.

While the present invention has been described with respect to particular embodiments, it is not in any way limited thereto but on the contrary may be modified or varied as will be apparent to those skilled in the art. In particular, for transporting frozen products, the thermal shield 6 will be removably mounted.

What is claimed is:

1. An isothermal container comprising a casing having isothermal walls defining an interior volume divided by a shield of thermally insulating material, into an upper chamber receiving a reservoir of refrigerant product, and a lower chamber for receiving a load, said upper and lower chambers freely communicating with one another via a passage provided all around the shield, said container further comprising a flexible impervious baffle structure depending from the periphery of the shield and extending downwardly into the lower chamber.

2. Container according to claim 1, wherein the shield is a plate structure supported via its upper surface in the upper chamber, and the baffle structure is fixed via its upper portion, to the edges of the plate structure.

3. Container according to claim 1, wherein the baffle structure is formed by a plurality of vertical bands of plastic material.

4. Container according to claim 1, wherein the lower chamber has inner walls which comprise a series of parallel ribs defining therebetween passages for gas circulation.

5. Container according to claim 4, wherein the ribs are formed in one piece with their corresponding inner wall.

6. Container according to claim 5, wherein the inner wall is formed from polyethylene.

7. Container according to claim 1, wherein the reservoir is a metal vat suspended in the upper chamber and has an open upper surface provided with a grill.

8. Container according to claim 7, wherein the reservoir comprises an open side face for loading refrigerant product.

9. Container according to claim 1, wherein the refrigerant product is dry ice.

10. Isothermal container comprising a casing having isothermal walls defining an interior volume divided by a shield of thermally insulating material, into an upper chamber receiving a reservoir of refrigerant product, and a lower chamber for receiving a load, said upper and lower chambers communicating with one another via a passage provided all around the shield, said container further comprising a flexible baffle structure extending downwardly into the lower chamber from peripheral regions of the shield, said baffle structure being formed by a plurality of vertical bands of plastic material.

11. Container according to claim 10, wherein the shield is a plate structure supported via its upper surface in the upper chamber, and the baffle structure is fixed via its upper portion, to the edges of the plate structure.

* * * * *